March 12, 1957     C. C. JOHNSON     2,784,520
STORAGE DEVICE
Filed March 1, 1954
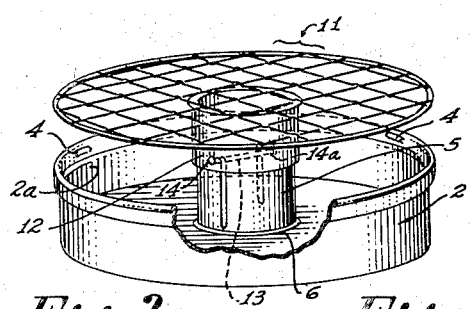
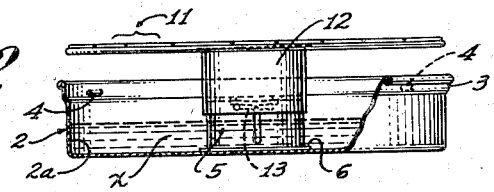
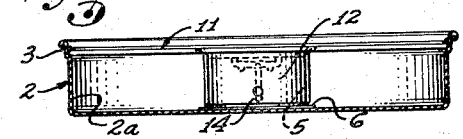
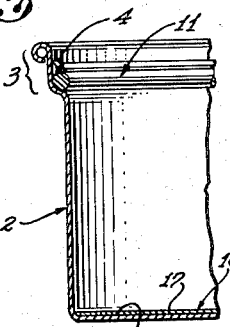
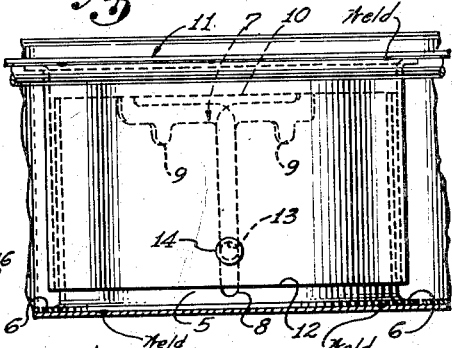
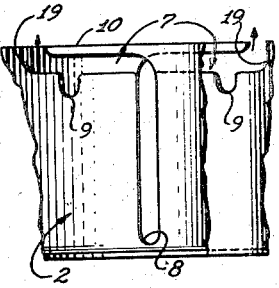
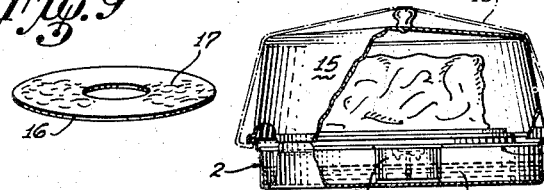
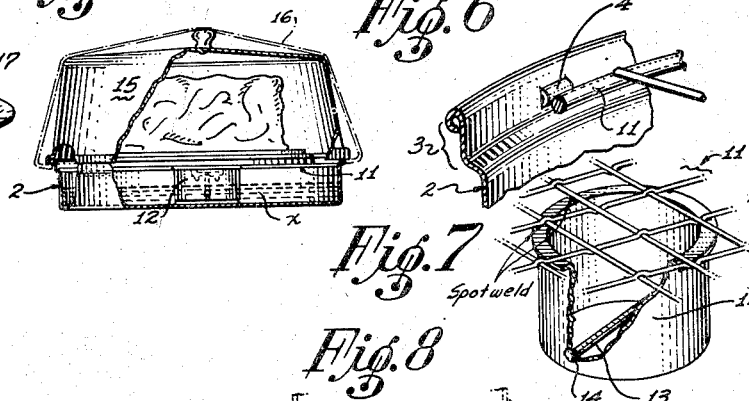
INVENTOR:
Clyde C. Johnson

United States Patent Office 2,784,520
Patented Mar. 12, 1957

2,784,520
STORAGE DEVICE
Clyde C. Johnson, Inglewood, Calif.

Application March 1, 1954, Serial No. 413,109

1 Claim. (Cl. 43—121)

My invention relates to storage devices, and more particularly to a novel storage device which is highly efficient for storing food to protect the same from crawling insects and the like.

Among the objects of my invention are:

To provide a storage device which is highly efficient for storing food.

To provide a storage device for storing food which is substantially insect-proof.

To provide a novel storage device which will keep bakery goods fresh for a relatively long period of time.

Briefly, in the preferred embodiment, the storage device of my invention takes the form of a container of any desired size having support means which is adapted to contain a trapping agent which effectively prevents insects of the crawling variety from gaining access to the food storage container.

The nature and principles embodied in my invention will be more clearly understood by reference to the accompanying drawings wherein:

Figure 1 is a perspective view showing one embodiment of my invention.

Figure 2 is a side elevation view in open position, and partially in section to show more clearly the device in use.

Figure 2a is a side elevation view in partial section to show the compact arrangement of the device of Figures 1 and 2 in closed position.

Figure 3 is a sectional view of the pan edge showing the flange and tabs holding the grid in closed position.

Figure 4 is a fragmentary sectional view of one preferred form of grid support and the novel construction thereof.

Figure 5 is a fragmentary view taken from Figure 4 to more clearly show guiding slots for the telescopic grid support of the foregoing figures.

Figure 6 is a perspective view illustrating more clearly the tabs on the circumferential flange holding the grid in position.

Figure 7 is a perspective view showing the key pin in position.

Figure 8 is a side elevational view of the key pin.

Figure 9 is a perspective view of the insect entrapping disc.

Figure 10 is a side elevational view showing a cover and wire lock attached to the bottom pan when in storage position.

As shown in Figures 1, 2, and 2a, one preferred embodiment of my invention takes the form of a shallow circular pan 2 having a circumferential flange 3 extending around the top thereof. Spaced around the flanges are several tabs 4 struck through the pan wall toward the center thereof as shown in detail in Figure 6. To the bottom of pan 2 and in the center thereof, a substantially cylindrical sleeve 5 is mounted on end; being fastened to the pan in any convenient manner such as by spot welding for example, in which case a right angled flange 6 will be desired on that end of sleeve 5.

At the top opening of sleeve 5, and on opposite sides of center, guide slots 7 are provided as best shown in Figures 4 and 5; the guide slots 7 having a bottoming end 8 near the base of sleeve 5, and a recess 9 adjacent the top opening 10 of sleeve 5.

A matching sleeve 12, being sized to slidably fit over base sleeve 5, is provided with a key pin 13 extending laterally through the center and penetrating opposite walls of sleeve 12 to align with guide slots 7 of base sleeve 5. Each end of key pin 13 is terminated on one end thereof with a riveted head 14a (Figure 8), and on the other end thereof with an upset head 14 to retain the key pin 13 in proper position in sleeve 12; the heads 14a and 14 being positioned outwardly of the sleeve 12 exterior. The sleeve 12 is fitted over base sleeve 5 so the key pin 13 is properly positioned in slots 7; the wall of outer sleeve 12 is interposed with a slight clearance.

A flat circular plate, perforated plate, or grill 11 is centered on and fastened to the top of outer sleeve 12; the fastening being accomplished in any convenient manner such as by spot weld. A suitable cover 15 of tin plate or clear plastic may be used if desired to complete the food compartment (Figure 10). A wire lock 16 holds the cover secure to the bottom pan or grill.

To prevent ants and other crawlers from gaining access to the food stores in the compartment, the pan 2 is filled with an insect trapping agent $x$ such as water, mild insect repellant solution, or the like. A glutinous or sticky composition can be substituted for the fluid if preferred. A most satisfactory means for achieving this latter expedient is shown in Figure 9 wherein a disposable flat disc 16 of paper or cloth of about the same diameter as the bottom of pan 2 is coated with a layer of sticky adhesive 17 of the general type used in manufacturing fly paper. A circular hole is cut out of the central portion to fit over base sleeve 5.

Thus it can be seen that when the device is not in use, the telescoping sleeves can be in closed or bottomed position with the base sleeve substantially enclosed by the outer sleeve 12; and the key pin 13 floats adjacent to the lower terminus of slot 7, as shown in Figure 4 wherein the compartment plate neatly rests in the flange 3 of pan 5, being retained therein by tabs 4 as shown in Figure 6.

When in use, outer sleeve 12 is raised and given a slight turn to position and rest key pin 13 in the upper recesses 9 as shown more clearly in Figures 4 and 5. For entire removal, when it is desired to clean the lower pan 5, for example, it can be turned slightly further in guide slots 7 and lifted out through slot 19, thereby keeping the utensils in a hygenic condition. It is easily seen that ants and crawlers cannot reach base sleeve 5, but will become entrapped in the agent $x$ contained in the pan—intermediate, the pan wall 2a and the base sleeve 5.

Other forms and modifications of my invention will readily come to the minds of those skilled in the art which, forms and modifications are deemed to fall within the scope of the appended claim.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

In combination with a food container including a base member and cover assembly; a shallow pan adapted to retain a quantity of insect entrapping substance, a flange extending around the top portion of said pan to define a recess adapted to receive the base member of said food container, gripping members for retaining said base member in said recess, a pair of cylinders slidable one over the other defining an extendible central support disposed intermediate said pan and said base member and fastened therebetween, said cylinders being relatively movable between extended and collapsed positions, and a key pin headed on both ends thereof mounted through the inner cylinder of said pair, the outer cylinder of said pair having vertical guide slots aligned with said key pin, said guide slots having upper recesses adapted to receive said key pin to hold said cylinders in extended position, said key pin guiding said cylinders in conjunction with said slots along a restricted path when said cylinders are being collapsed, said support being extendible from a collapsed position wherein said base member is recessed in said pan flange, to an extended position supporting said base member an appreciable distance over said pan.

References Cited in the file of this patent

UNITED STATES PATENTS

| | | | |
|---|---|---|---|
| D. 160,763 | Barrett | | Nov. 7, 1950 |
| 133,763 | Curtis | | Dec. 10, 1872 |
| 447,678 | Gibson | | Mar. 3, 1891 |
| 533,017 | Peeler | | Jan. 22, 1895 |
| 750,632 | Fisher | | Jan. 26, 1904 |
| 1,507,731 | Gregorie | | Sept. 9, 1924 |
| 1,581,410 | Welsh | | Apr. 20, 1926 |
| 1,850,131 | Mennicke | | Mar. 22, 1932 |
| 2,356,022 | Wright | | Aug. 15, 1944 |

FOREIGN PATENTS

| | | |
|---|---|---|
| 306,627 | Great Britain | 1929 |